May 19, 1964   V. JENKS   3,133,581

TRACTION DEVICE

Filed March 27, 1962

INVENTOR.
Vincent Jenks
BY
Roger Hammer
Attorney

3,133,581
TRACTION DEVICE
Vincent Jenks, 943 Lincoln Ave., Erie, Pa.
Filed Mar. 27, 1962, Ser. No. 183,342
3 Claims. (Cl. 152—216)

This invention is a traction device having a flexible annular section which conforms with the outside of the tire and carries lugs which progressively roll between the road and tire tread. The driving torque is primarily transmitted through the friction grip between the annular section and the outside of the tire. The result is a lightweight structure which may be conveniently mounted and demounted in accordance with driving conditions.

Figure 2:
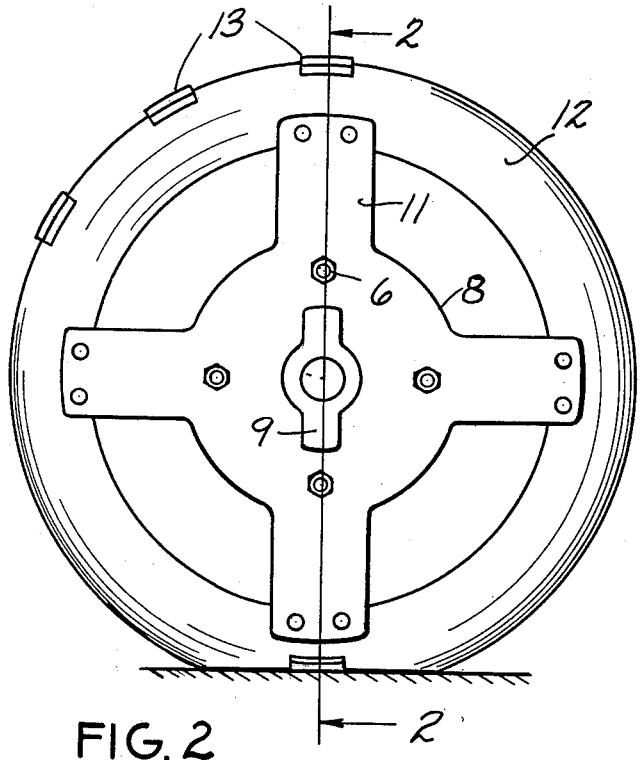
Figure 1:
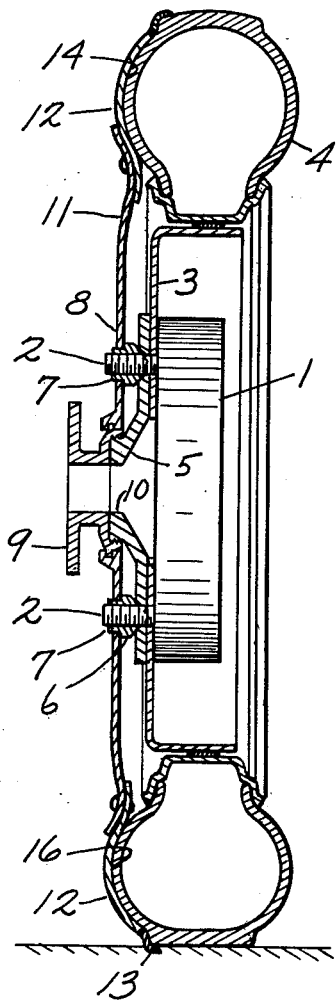

In the drawing, FIG. 1 is a section through a wheel with the traction device installed, the section being taken on line 2—2 of FIG. 2, and FIG. 2 is a side elevation.

In the drawing, there is diagrammatically indicated a brake drum 1 carrying threaded studs 2 extending through the hub 3 of a wheel on which is mounted a pneumatic tire 4. These parts are or may be of common construction and may differ substantially in appearance from the particular structure illustrated.

For mounting the traction device there is a base plate 5 which fits over the studs 2 and is solidly clamped thereto by nuts 6. The nuts 6 are of special shape having cylindrical projections 7 so that when the base plate 5 is mounted, there are a plurality of angularly spaced cylindrical projections available to receive the hub 8 of the traction device. By reason of the special nuts 6, the cylindrical projections 7 are in alignment with the wheel studs 2 but this is not necessary as separate projections equivalent to the projections 7 might be provided on the base plate. The hub 8 is attached to the base plate by a wing nut 9 rotatably carried in the hub 8 and threaded on a central projection 10 on the base plate. The wing nut permits ready removal and replacement of the traction device.

Extending outwardly from the hub 8 are a plurality of spring arms 11, the outer ends of which are riveted or otherwise suitably secured to an annular traction member 12 of suitable flexible material such as fabric reinforced rubber or flexible plastic. The arms 11, when assembled, bear with substantial tension against the outer surface of the tire so that the annular member 12 normally rides in friction engagement with the outer surface of the tire. Suitably attached to the periphery of the member 12 adjacent the outside edge of the tire tread are a plurality of circumferentially spaced traction lugs 13. As each of these lugs come into driving position, as shown at the bottom of FIG. 2, the lugs are drawn beneath the tire tread so that the weight of the vehicle presses the lug into gripping contact with the road. The inward folding of the lugs is facilitated by the initial concave curvature 14 of the annular member 12 which causes it to follow or fit the natural convex curvature of the tire. As the lugs move into driving position, the convex curvature is increased and the lugs extend further inward beneath the tread. In the driving position, there is a tight friction grip not only between the lugs 13 and the tire tread, but between the adjacent surface 16 of the member 12 which is stretched tightly against the outer surface of the tire. The friction is adequate to sustain the entire driving torque so that the projections 7 are not called upon to transmit the driving torque although they are available.

The traction device is easily removed and installed since only a single wing nut 9 fastens the device in place and the entire operation takes place from the outside of the tire.

What is claimed as new is:

1. A traction device comprising a hub having a plurality of spring arms projecting radially therefrom the outer ends of which exert substantial tension against the outer surface of a pneumatic tire, an annulus of flexible material fixed to the projecting ends of the arms and having a concave surface held by said arms against the outer surface of a pneumatic tire casing with the outer periphery of the annulus adjacent the outside edge of the tire tread, said annulus being sufficiently flexible to follow the natural convex curvature of the outer surface of the tire, a plurality of circumferentially spaced lugs fixed to the outer periphery of the annulus in position to be drawn beneath the tread as the lugs come into driving position, and means for attaching the hub of the traction device to a wheel hub.

2. A traction device comprising a hub having a plurality of spring arms projecting radially therefrom the outer ends of which exert substantial tension against the outer surface of a pneumatic tire, an annulus of flexible material fixed to the projecting ends of the arms and having a concave surface held by said arms against the outer surface of a pneumatic tire casing with the outer periphery of the annulus adjacent the outside edge of the tire tread, a plurality of circumferentially spaced lugs fixed to the outer periphery of the annulus in position to be drawn beneath the tread as the lugs come into driving position, a base plate mounted on the outside of a wheel and having means nonrotatably interlocking with said hub and a nut for clamping said hub against the base plate.

3. A traction device comprising a hub having a plurality of spring arms projecting radially therefrom, an annulus of flexible material fixed to the projecting ends of the arms and having a concave surface held by said arms against the outer surface of a pneumatic tire casing with the outer periphery of the annulus adjacent the outside edge of the tire tread, a plurality of circumferentially spaced lugs fixed to the outer periphery of the annulus in position to be drawn beneath the tread as the lugs come into driving position, wheel mounting nuts having cylindrical projections, a base plate mounted on the wheel by said nuts, said hub having holes receiving said cylindrical projections, and said base plate having a wing nut for clamping said hub against said base plate.

References Cited in the file of this patent
UNITED STATES PATENTS

| | | |
|---|---|---|
| 1,391,342 | Pulliam | Sept. 20, 1921 |
| 1,602,984 | McFall | Oct. 12, 1926 |
| 2,494,850 | Williams | Jan. 17, 1950 |
| 2,730,156 | Ansel | Jan. 10, 1956 |
| 2,986,190 | Lamb | May 30, 1961 |